United States Patent
Kobayashi et al.

(10) Patent No.: US 7,900,081 B2
(45) Date of Patent: Mar. 1, 2011

(54) MICROCOMPUTER AND CONTROL SYSTEM HAVING THE SAME

(75) Inventors: Chikara Kobayashi, Kodaira (JP); Shinichirou Taguchi, Nukata-gun (JP); Yoshinori Gotoh, Kariya (JP); Youichi Fujita, Toyoake (JP); Hideaki Ishihara, Okazaki (JP)

(73) Assignee: Denso Corporation, Kariya (JP)

( * ) Notice: Subject to any disclaimer, the term of this patent is extended or adjusted under 35 U.S.C. 154(b) by 866 days.

(21) Appl. No.: 11/878,799

(22) Filed: Jul. 26, 2007

(65) Prior Publication Data

US 2008/0052555 A1 Feb. 28, 2008

(30) Foreign Application Priority Data

Jul. 28, 2006 (JP) .............................. 2006-206166
Feb. 5, 2007 (JP) .............................. 2007-025473

(51) Int. Cl.
G06F 1/04 (2006.01)
(52) U.S. Cl. ...................... 713/600; 713/501
(58) Field of Classification Search .................. 713/340, 713/500, 502, 501, 600
See application file for complete search history.

(56) References Cited

U.S. PATENT DOCUMENTS 5,539,910 A 7/1996 Brueckmann et al.
5,737,588 A * 4/1998 Maeda et al. ............... 713/500
6,674,318 B2 1/2004 Kanada et al.
2001/0033195 A1 10/2001 Kanada et al.
2003/0088849 A1 * 5/2003 Yamauchi ..................... 716/19
2004/0093531 A1 * 5/2004 Espinor et al. .............. 713/340
2004/0131123 A1 * 7/2004 Maki et al. ................... 375/257
2005/0022044 A1 1/2005 Shimosakoda
2006/0288240 A1 * 12/2006 Kardach et al. ............. 713/300

FOREIGN PATENT DOCUMENTS

JP A-08-006681 1/1996
JP A-2006-121178 5/2006

OTHER PUBLICATIONS

Office Action dated May 13, 2009 from German Patent Office in a corresponding DE Application No. 10 2007 031 928.4 (and English Translation).

* cited by examiner

*Primary Examiner*—Chun Cao
(74) *Attorney, Agent, or Firm*—Posz Law Group, PLC

(57) ABSTRACT

A microcomputer includes a main oscillator for generating and outputting a main clock signal, a sub oscillator for generating and outputting a sub clock signal, a central processing unit that operates based on the main clock signal, a signal output circuit that operates based on the sub clock signal and outputs a timing signal at a predetermined interval, and a voltage monitoring circuit that operates based on the sub clock signal and intermittently performs a voltage monitoring function in response to the timing signal. The sub oscillator operates independently of the main oscillator.

20 Claims, 8 Drawing Sheets

US 7,900,081 B2

MICROCOMPUTER AND CONTROL SYSTEM HAVING THE SAME

CROSS REFERENCE TO RELATED APPLICATION

This application is based on and incorporates herein by reference Japanese Patent Applications No. 2006-206166 filed on Jul. 28, 2006 and No. 2007-25473 filed on Feb. 5, 2007.

FIELD OF THE INVENTION

The present invention relates to a microcomputer for periodically performing a voltage monitoring function, and relates to a control system having the microcomputer.

BACKGROUND OF THE INVENTION

A microcomputer has been proposed that performs a voltage monitoring function by using an analog to digital (A/D) converter. A microcomputer 15 shown in FIG. 9 includes a central processing unit (CPU) 1, an oscillator 2, an oscillation stop circuit 3, an oscillation control circuit 4, and a frequency divider circuit 5, a voltage detection circuit 6, and an A/D analog circuit 7. The voltage detection circuit 6 includes an A/D analog controller 8, a threshold set register 9, a detection start register 10, a result store register 11, an interrupt register 12, an interrupt enable register 13, and an AND gate 14. The microcomputer 15 monitors and detects a voltage applied to a voltage input terminal by using the voltage detection circuit 6.

When the microcomputer 15 operates in a normal mode, the CPU 1 is supplied with a clock signal from the oscillator 2 through the oscillation stop circuit 3. The clock signal passing through the oscillation stop circuit 3 is fed to the voltage detection circuit 6 through the frequency divider circuit 5. When the microcomputer 15 switches from the normal mode to a low power consumption mode (i.e., sleep mode), the CPU 1 controls the oscillation control circuit 4 to stop the oscillator 2 and the oscillation stop circuit 3.

The A/D analog circuit 7 and the A/D analog controller 8 form a successive approximation register type A/D converter, for example. When a start flag is set in the detection start register 10, the A/D analog controller 8 starts its operation. The voltage applied to the voltage input terminal is inputted to the A/D analog circuit 7. The A/D analog circuit 7 converts the inputted voltage to detection voltage data by comparing the inputted voltage with reference voltages fed from the A/D analog controller 8. The detection voltage data is outputted to the A/D analog controller 8.

The A/D analog controller 8 compares the detection voltage data with threshold voltage data, which is stored in the threshold set register 9. The result of the comparison is stored in the result store register 11 so that the voltage monitoring function is completed. When the voltage monitoring function is completed, an interrupt flag is set in the interrupt register 12. If an interrupt enable flag is set in the interrupt enable register 13 at this time, the AND gate 14 outputs an interrupt request signal to the CPU 1.

As shown in FIG. 10, after the microcomputer 15 switches to the sleep mode, the oscillator 2 stops its operation. As a result, the clock signal is not supplied to the voltage detection circuit 6 so that the voltage detection circuit 6 cannot perform its operation. Therefore, the microcomputer 15 cannot perform the voltage monitoring function in the sleep mode.

There may be a need to periodically and successively continue the voltage monitoring function, regardless of whether the microcomputer 15 operates in the normal mode or the sleep mode. In this case, the whole microcomputer 15 including the CPU 1 needs to wake up from the sleep mode to perform the voltage monitoring function. As a result, power consumption of the microcomputer 15 becomes large so that power efficiency of the microcomputer 15 becomes low.

SUMMARY OF THE INVENTION

In view of the above-described problem, it is an object of the present invention to provide a microcomputer for periodically performing a voltage monitoring function with high power efficiently, and to provide a control system having the microcomputer.

A microcomputer includes an input terminal for receiving a voltage, a main oscillator for generating a main clock signal having a first frequency, a sub oscillator for generating a sub clock signal having a second frequency less than the first frequency, a central processing unit that operates based on the main clock signal, a signal output circuit that operates based on the sub clock signal and outputs a timing signal at a predetermined interval, and a voltage monitoring circuit that operates based on the sub clock signal and intermittently performs a voltage monitoring function in response to the timing signal.

The microcomputer has a low power consumption mode. In the low power consumption mode, the main oscillator is prevented from generating the main clock signal so that the main clock signal is not supplied to the central processing unit. In contrast, even in the low power consumption mode, the sub oscillator continues to supply the sub clock signal to each of the signal output circuit and the voltage monitoring circuit. Thus, the voltage monitoring circuit continues to perform the voltage monitoring function, ever after the microcomputer switches to the low power consumption mode.

A control system includes the microcomputer, and a control device receiving a signal from the microcomputer. The microcomputer is powered by the voltage received by the input terminal. When the signal indicates a drop in the voltage, the control device acts to keep the voltage at a predetermined level.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
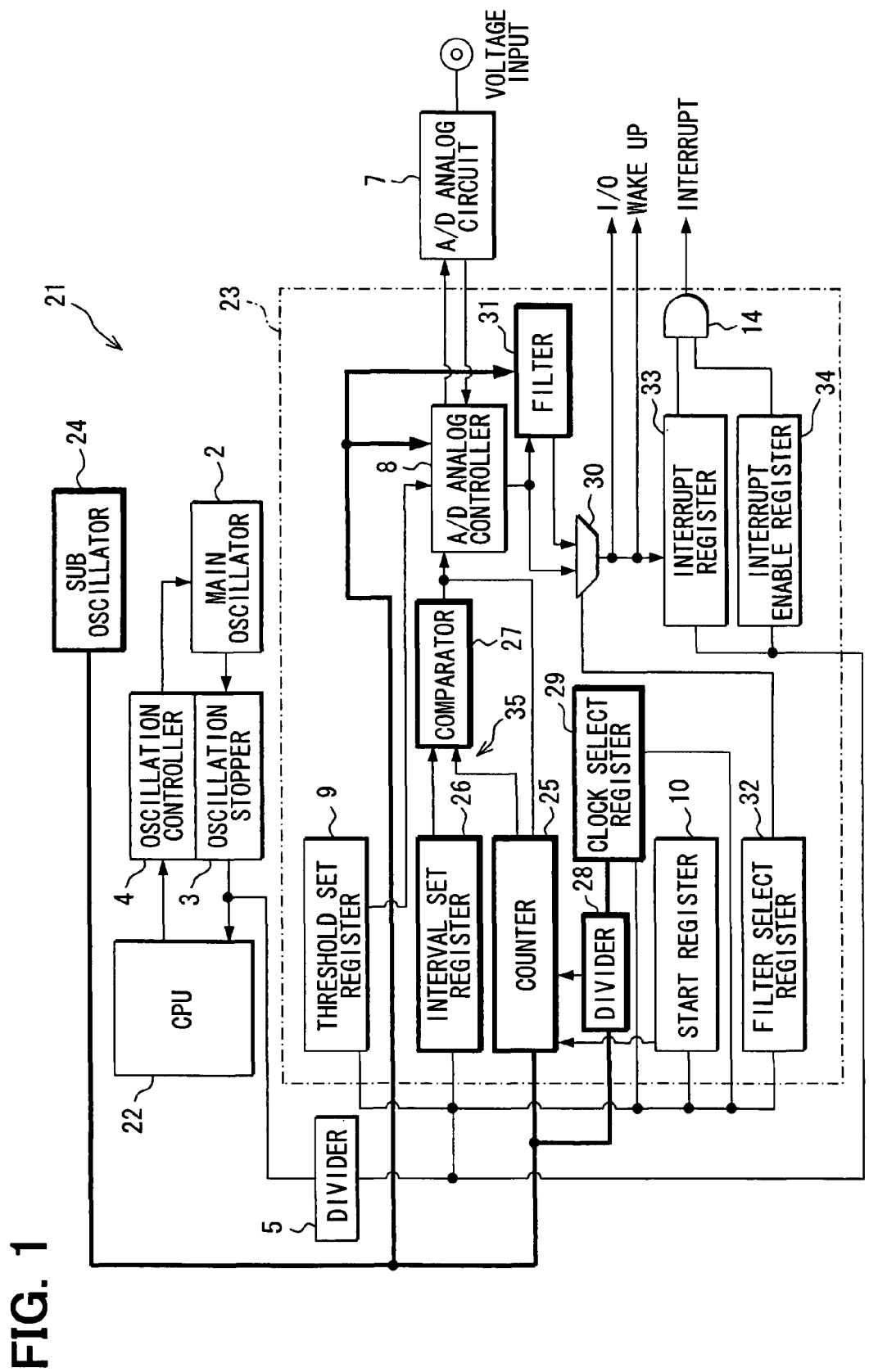
FIG. 1 is a block diagram of a microcomputer according to a first embodiment of the present invention.

As shown in FIG. 1, a microcomputer 21 according to a first embodiment of the present invention includes a main oscillator 2, an oscillation stop circuit 3, an oscillation control circuit 4, a first frequency divider circuit 5, an A/D analog circuit 7, a central processing unit (CPU) 22, a voltage detection circuit 23, and a sub oscillator 24. For example, the microcomputer 21 is used in an electronic control unit (ECU) for a vehicle. The microcomputer 21 monitors a voltage of a vehicle battery and detects a drop in the battery voltage below a predetermined threshold value. The microcomputer 21 operates in a normal mode and in a low power consumption mode (i.e., sleep mode).

The main oscillator 2 generates a main clock signal having a first frequency of tens of megahertz (MHz). When the microcomputer 21 operates in the normal mode, the main oscillator 2 supplies the main clock signal to the CPU 22 via the oscillation stop circuit 3. The main clock signal passing through the oscillation stop circuit 3 is supplied to the voltage detection circuit 23 via the first frequency divider circuit 5. The sub oscillator 24 generates a sub clock signal having a second frequency of tens of kilohertz (KHz). Therefore, the second frequency of the sub clock signal is less than the first frequency of the main clock signal. The sub oscillator 24 supplies the sub clock signal to the voltage detection circuit 23, regardless of whether the microcomputer 21 operates in the normal mode or the sleep mode.

The main and sub oscillators 2, 24 may be, for example, constructed with a digital phase-locked loop (PLL) circuit having a ring oscillator. For example, a clock generator disclosed in JP-A-2006-121178 may be used as the main and sub oscillators 2, 24. The oscillation stop circuit 3 is a logic gate that can prevent the main clock signal from reaching the CPU 22.

When the microcomputer 21 switches from the normal mode to the sleep mode, the CPU 22 controls the oscillation control circuit 4 to cause the main oscillator 2 to stop its operation so that the main clock signal is not generated. Further, the CPU 22 controls the oscillation control circuit 4 to cause the oscillation stop circuit 3 to prevent the main clock signal from reaching the CPU 22. Thus, the CPU 22 cannot receive the main clock signal in the sleep mode.

The voltage detection circuit 23 includes an A/D analog controller 8, a threshold set register 9, a detection start register 10, a two-input AND gate 14, an interval counter 25, an interval set register 26, a comparator 27, a second frequency divider circuit 28, a clock select register 29, a multiplexer 30, a filter circuit 31, a filter select register 32, an interrupt register 33, and an interrupt enable register 34. The interval counter 25, the interval set register 26, the comparator 27, the second frequency divider circuit 28, and the clock select register 29 form a signal output circuit 35.

For example, the A/D analog circuit 7 and the A/D analog controller 8 form a successive approximation register (SAR) A/D converter and convert the battery voltage to detection voltage data. The battery voltage is applied to the A/D analog circuit 7 via a voltage input terminal. Reference voltages are fed to the A/D analog circuit 7 from the A/D analog controller 8. The A/D analog circuit 7 compares the battery voltage with the reference voltages and outputs the result of the comparison to the A/D analog controller 8. Thus, the battery voltage is converted to the detection voltage data.

The CPU 22 sets threshold voltage data in the threshold set register 9. The threshold set register 9 outputs the threshold voltage data to the A/D analog controller 8. The CPU 22 sets start flag in the detection start register 10. When the start flag is set in the detection start register 10, the detection start register 10 sends a start signal to the interval counter 25. Upon receipt of the start signal, the interval counter 25 starts counting based on the sub clock signal. The interval counter 25 outputs count data to the comparator 27.

Also, the CPU 22 sets detection interval data in the interval set register 26. The voltage detection circuit 23 performs a voltage monitoring function at a voltage detection interval corresponding to the detection interval data. The interval set register 26 outputs the detection interval data to the comparator 27.

When the count data of the interval counter 25 becomes equal to the detection interval data, the comparator 27 outputs a timing signal to the A/D analog controller 8. Also, the timing signal is fed to the interval counter 25 and clears the interval counter 25.

The interval counter 25 is provided with the second frequency divider circuit 28 and the clock select register 29. As described above, the interval counter 25 performs counting based on the sub clock signal. In short, the interval counter 25 is incremented every clock cycle of the sub clock signal, and a count cycle of the interval counter 25 is equal to the clock cycle of the sub clock signal. By setting cycle data in the clock select register 29, the count cycle of the interval counter 25 can be changed. For example, when the cycle data of "2" is set in the clock select register 29, the second frequency divider circuit 28 outputs a count mask signal to the interval counter 25 every two clock cycle of the sub clock signal. While receiving the count mask signal, the interval counter 25 stops counting. As a result, the interval counter 25 is incremented every two clock cycle of the sub clock signal. Thus, the count cycle of the interval counter 25 becomes twice the clock cycle of the sub clock signal.

In response to the timing signal, the A/D analog controller 8 starts its operation. Specifically, the A/D analog controller 8 compares the detection voltage data with the threshold voltage data, which is received from the threshold set register 9. The A/D analog controller 8 outputs a detection result, indicative of a result of the comparison, to the multiplexer 30 and the filter circuit 31. Specifically, when the detection voltage data is equal to or greater than the threshold voltage data, the detection result becomes low. When the detection voltage data is less than the threshold voltage data, the detection result becomes high.

The filter circuit 31 holds previous detection result that is received from the A/D analog controller 8 at a previous time. The filter circuit 31 compares the previous detection result with present detection result that is received from the A/D analog controller 8 at a present time immediately subsequent to the previous time. When the present detection result is equal to the previous detection result, the output of the filter circuit 31 is enabled.

The CPU 22 sets a filter select flag in the filter select register 32. When the filter select flag is set in the filter select register 32, the filter select register 32 sends a filter select signal to the multiplexer 30. In accordance with the filter select signal, the multiplexer 30 selects and forwards one of the input from the A/D analog controller 8 and the input from the filter circuit 31 to the interrupt register 33. The interrupt register 33 holds the detection result received from the multiplexer 30.

The CPU 22 sets an interrupt flag in the interrupt enable register 34. The interrupt flag indicates whether an interrupt is enabled or disabled. When the detection result is high and the interrupt flag indicates the interrupt is enabled, the AND gate 14 outputs an interrupt request signal to the CPU 22.

The output of the multiplexer 30 is coupled to the oscillation control circuit 4 and an I/O terminal of an external circuit (not shown). Thus, the detection result outputted from the multiplexer 30 is fed to the oscillation control circuit 4 and the external circuit. When the microcomputer 21 operates in the sleep mode, the detection result acts as a wake up signal for causing the microcomputer 21 to wake up from the sleep mode.

In the voltage detection circuit 23, the sub clock signal is supplied to the A/D analog controller 8, the filter circuit 31, the interval counter 25, and the second frequency divider circuit 28. The main clock signal is supplied to the threshold set register 9, the detection start register 10, the interval set register 26, the clock select register 29, the interrupt register 33, and the interrupt enable register 34 via the first frequency divider circuit 5.

Figure 2:
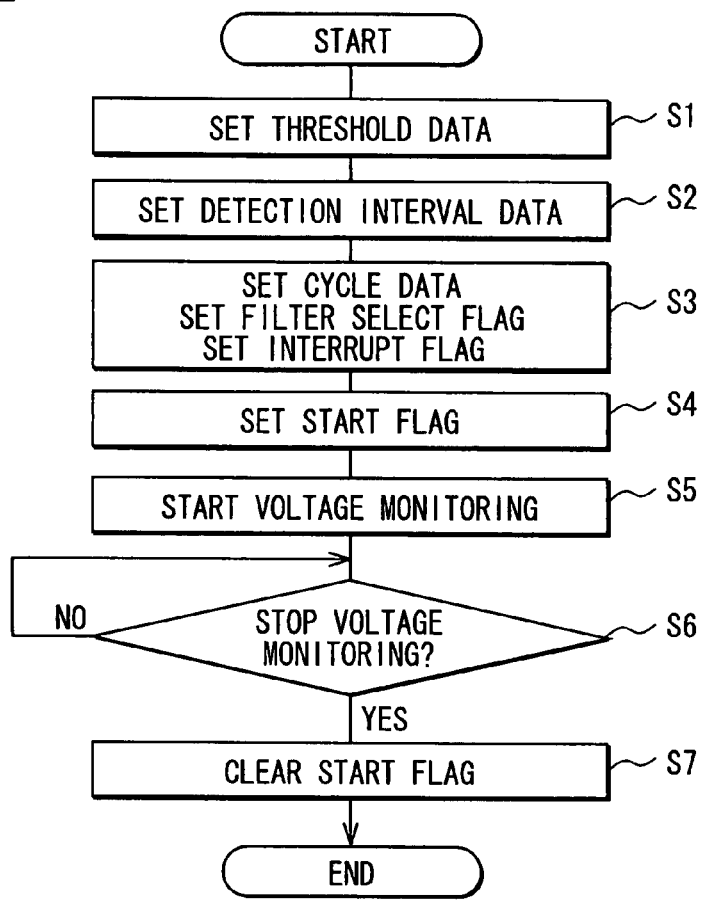
FIG. 2 is a flow chart of a process performed by a central processing unit in the microcomputer of FIG. 1.

The CPU 22 executes a process shown in FIG. 2 to cause the voltage detection circuit 23 to perform the voltage monitoring function. The process starts with step S1, where the CPU 22 sets the threshold voltage data in the threshold set register 9. Then, the process proceeds to step S2, where the CPU 22 sets the detection interval data in the interval set register 26. Then, the process proceeds to step S3.

At step S3, the CPU 22 sets the cycle data in the clock select register 29. Further, the CPU 22 sets the filter select flag in the filter select register 32. Furthermore, the CPU 22 sets the interrupt flag in the interrupt enable register 34.

Then, the process proceeds to step S4, where the CPU 22 sets the start flag in the detection start register 10. Then, the process proceeds to step S5, where the voltage detection circuit 23 starts the voltage monitoring function and detects the battery voltage at intervals determined by the detection interval data and the cycle data.

Then, the process proceeds to step S6, where the voltage detection circuit 23 continues the voltage monitoring function until the CPU 22 determines to stop the voltage monitoring function. If the CPU 22 determines to stop the voltage monitoring function, the process proceeds to step S7, where the CPU 22 clears the start stag, which is set in the detection start register 10.

Figure 3:
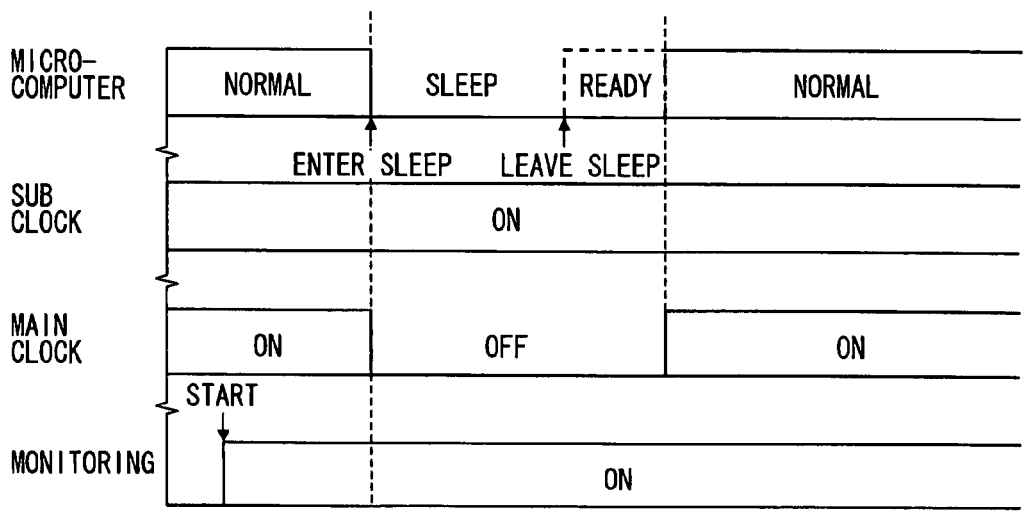
FIG. 3 is a timing chart of the microcomputer of FIG. 1.

As shown in a timing chart of FIG. 3, after the microcomputer 21 switches from the normal mode to the sleep mode, the main oscillator 2 stops its operation so that the main clock signal is not generated. In contrast, even after the microcomputer 21 switches from the normal mode to the sleep mode, the sub oscillator 24 continues its operation so that the supply of the sub clock signal to the voltage detection circuit 23 can be continued. Therefore, once the voltage detection circuit 23 starts the voltage monitoring function at step S5 of FIG. 2, the voltage detection circuit 23 continues the voltage monitoring function even in the sleep mode.

The microcomputer 21 switches from the normal mode to the sleep mode as follows: The CPU 22 sends a stop command to the oscillation control circuit 4. In response to the stop command, the oscillation control circuit 4 disables the output of the oscillation stop circuit 3 to prevent the main clock signal from reaching the CPU 22. Further, the oscillation control circuit 4 stops the main oscillator 2 so that the main clock signal is not generated.

The microcomputer 21 wakes up from the sleep mode as follows: When the wake up signal is fed to the oscillation control circuit 4 in the sleep mode, the oscillation control circuit 4 starts the main oscillator 2 and enables the output of the oscillation stop circuit 3. As a result, the main clock signal is generated and reaches the CPU 22 through the oscillation stop circuit 3. Thus, the microcomputer 21 wakes up from the sleep mode.

Figure 4:
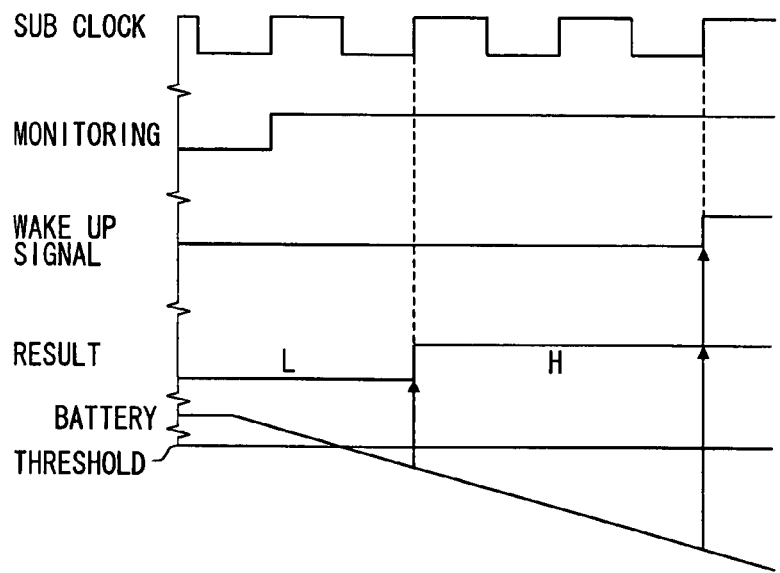
FIG. 4 is a timing chart illustrating when a wake up signal is outputted in the microcomputer of FIG. 1.

The drop in the battery voltage below the threshold value is detected in the sleep mode as shown in a timing chart of FIG. 4. In the case of FIG. 4, the multiplexer 30 selects the input from the filter circuit 31. As shown in FIG. 4, when the battery voltage applied to the voltage input terminal is equal to or greater than the threshold value, the detection result outputted from the A/D analog controller 8 is low. When the battery voltage decreases below the threshold value, the detection result becomes high.

The filter circuit 31 receives and holds the detection result. If the low battery voltage condition lasts, the detection result remains high. As a result, the previous detection result becomes equal to the present detection result so that the output of the filter circuit 31 is enabled. Thus, the wake up signal is outputted to the oscillation control circuit 4, only when the previous detection result is equal to the present detection result. Noise may cause temporary voltage change, and the wake up signal may be accidentally outputted due to the temporary voltage change. The filter circuit 31 checks whether the previous detection result is equal to the present detection result. In such an approach, the accidental wake up signal due to the temporary voltage change can be prevented by the filter circuit 31.

In the sleep mode, when the oscillation control circuit 4 receives the wake up signal, the oscillation control circuit 4 starts the main oscillator 2. The microcomputer 21 wakes up from the sleep mode and switches to the normal mode. Then, the CPU 22 is interrupted by the interrupt request signal outputted from the AND gate 14, because the interrupt register 33 is supplied with the main clock signal and starts its operation. Thus, the CPU 22 recognizes that the wake up signal results from the drop in the battery voltage below the threshold value. Therefore, the CPU 22 executes an interrupt processing.

In the normal mode, the CPU 22 is interrupted and executes the interrupt processing approximately at the same time when the oscillation control circuit 4 receives the wake up signal.

Figure 5A:
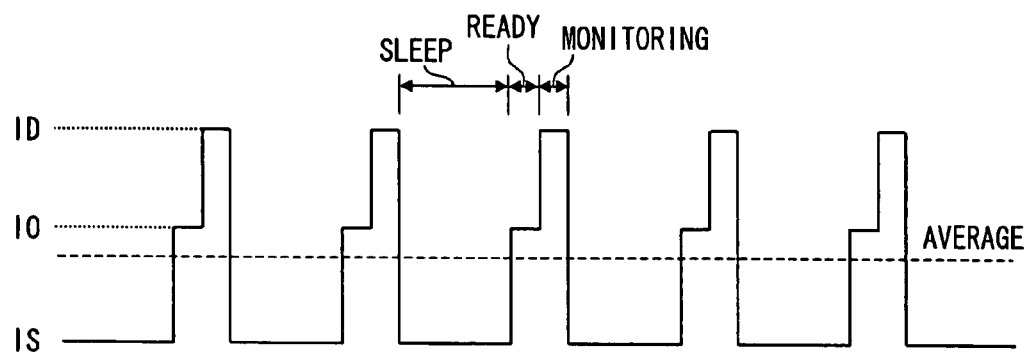
FIG. 5A is a graph showing a current consumption in a microcomputer of FIG. 9.
Figure 9:
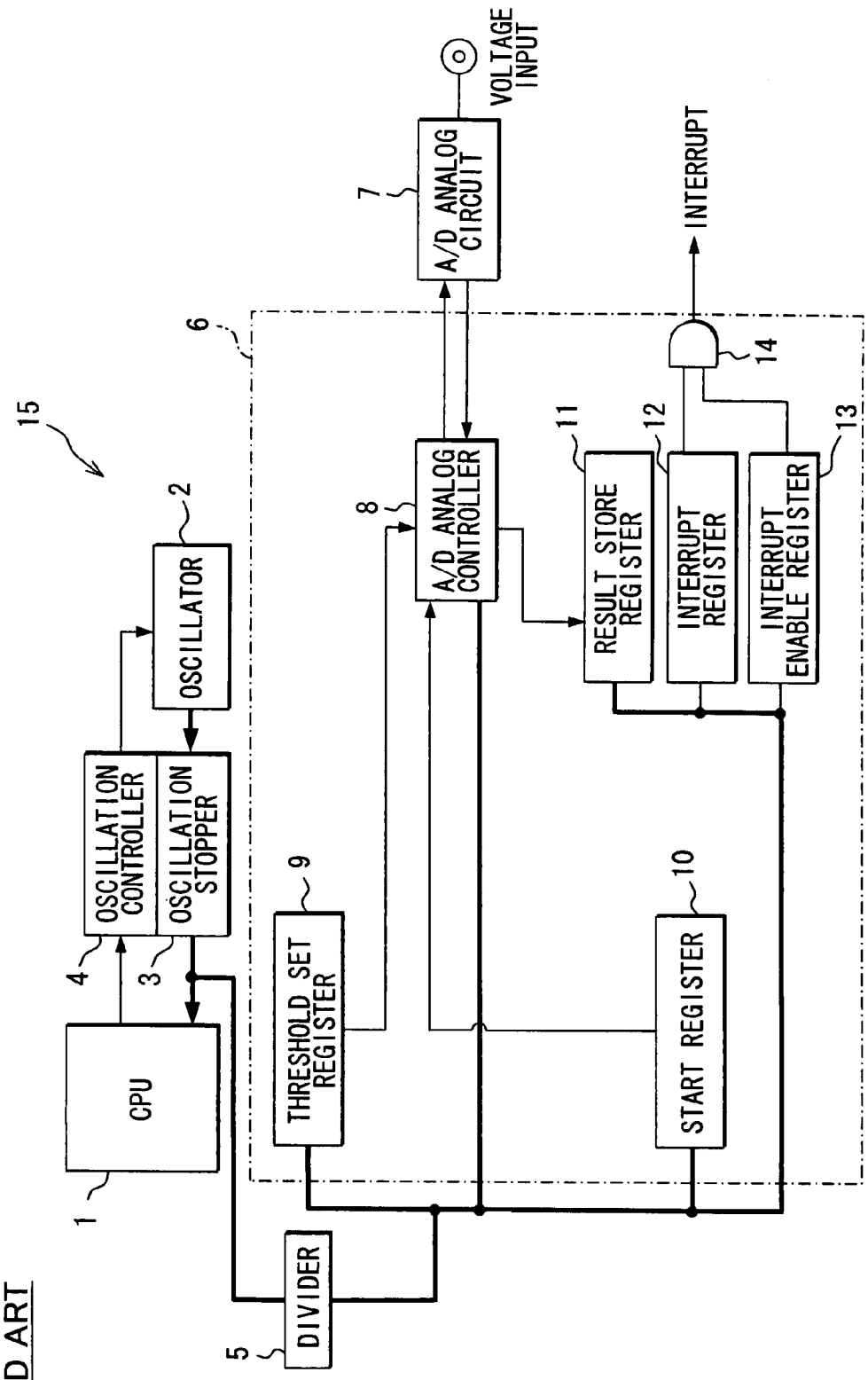
FIG. 9 is a block diagram of a microcomputer according to a related art.
Figure 10:
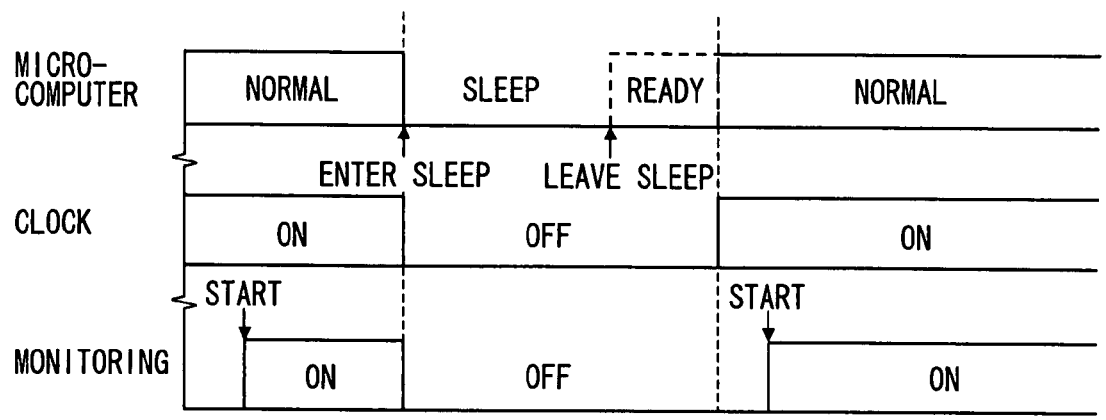
FIG. 10 is a timing chart of the microcomputer of FIG. 9.

FIG. 5A shows an electric current consumed in the conventional microcomputer 15 shown in FIG. 9 when the voltage detection circuit 6 intermittently and periodically performs the voltage detection function. The electric current flowing in the sleep mode is a sleep current IS. In the conventional microcomputer 15, the sleep mode needs to be released when the voltage detection function is performed. When the sleep mode is released and the main oscillator 2 operates to supply the main clock signal, the electric current increases to a current IO. Then, when the CPU 1 starts its operation, the electric current increases to a current ID.

Figure 5B:
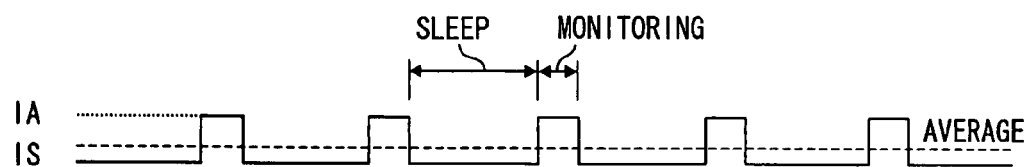
FIG. 5B is a graph showing a current consumption in the microcomputer of FIG. 1.

FIG. 5B shows an electric current consumed in the microcomputer 21 shown in FIG. 1 when the voltage detection circuit 23 intermittently and periodically performs the voltage detection function. The electric current flowing in the sleep mode is a sleep current IS. In the microcomputer 21 according to the first embodiment, the sleep mode does not need to be released when the voltage detection function is performed. Since the voltage detection function is performed based on the sub clock signal, the main oscillator 2 does not operate in the sleep mode. Accordingly, the CPU 22 does not operate. Thus, the electric current increases to only a current IA. Therefore, an average current consumption in the microcomputer 21 is much less than that in the conventional microcomputer 15.

As described above, according to the first embodiment, the microcomputer 21 includes the voltage detection circuit 23 and the sub oscillator 24. The sub oscillator 24 operates independently of the main oscillator 2. The sub oscillator 24 supplies the sub clock signal to the voltage detection circuit 23, regardless of whether the microcomputer 21 operates in the normal mode or in the sleep mode. The voltage detection circuit 23 includes the signal output circuit 35 for generating a periodic timing signal based on the sub clock signal. The voltage detection circuit 23 intermittently and periodically performs the voltage detection function in response to the timing signal. In such an approach, the voltage detection circuit 23 can continue the voltage detection function based on the sub clock signal, even after the microcomputer 21 switches to the sleep mode, and the CPU 22 stops its operation. Thus, power consumption required to periodically perform the voltage detection function can be reduced.

Further, the voltage detection circuit 23 includes the clock select register 29. The count cycle of the interval counter 25 can be changed by changing the cycle data, which is set in the clock select register 29 by the CPU 22. In short, an output cycle of the timing signal outputted from the signal output circuit 35 to the A/D analog controller 8 can be changed by changing the cycle data. Thus, a voltage detection cycle of the voltage detection circuit 23 can be changed according to types of voltages to be monitored or detected.

Furthermore, the voltage detection circuit 23 includes the filter circuit 31. The filter circuit 31 receives and stores the detection result. The filter circuit 31 checks whether the previous detection result received at the previous time is equal to the present detection result received at the present time immediately subsequent to the previous time. In accordance with the filter select flag, which is set in the filter select register 32 by the CPU 22, one of the output of the A/D analog controller 8 and the output of the filter circuit 31 is selected as the detection result. Thus, the voltage detection function can be performed according to conditions of the voltage to be monitored. For example, when the voltage to be monitored has a lot of noise, the output of the filter circuit 31 may be selected to prevent accidental wake up signal.

Furthermore, the detection result is used as the wake up signal for releasing the sleep mode and the interrupt request signal for interrupting the CPU 22. Also, the detection result is fed to the external device. In such an approach, the detection result can be efficiently used according to applications for the microcomputer 21.

Second Embodiment

Figure 6:
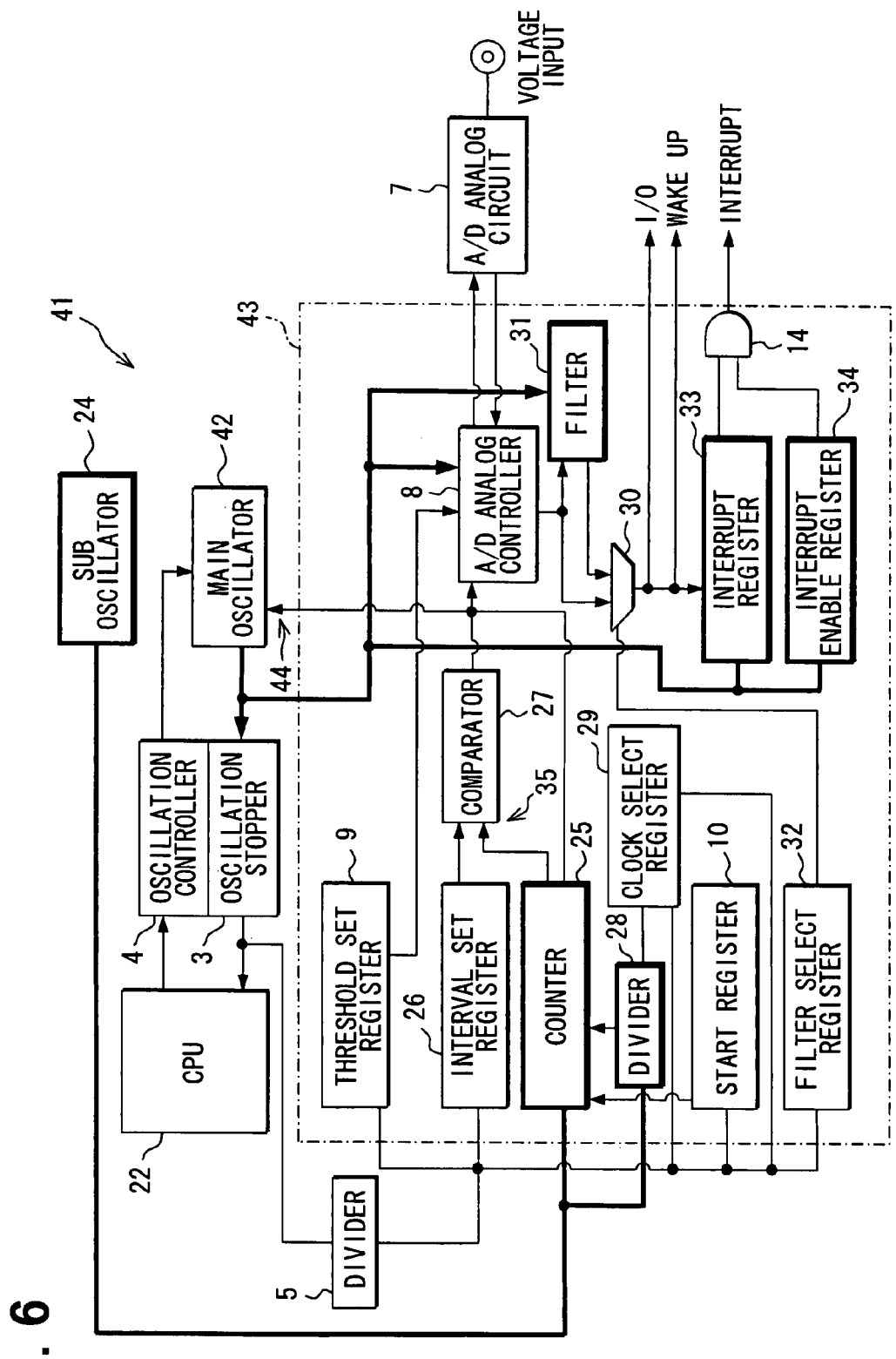
FIG. 6 is a block diagram of a microcomputer according to a second embodiment of the present invention.
Figure 7:
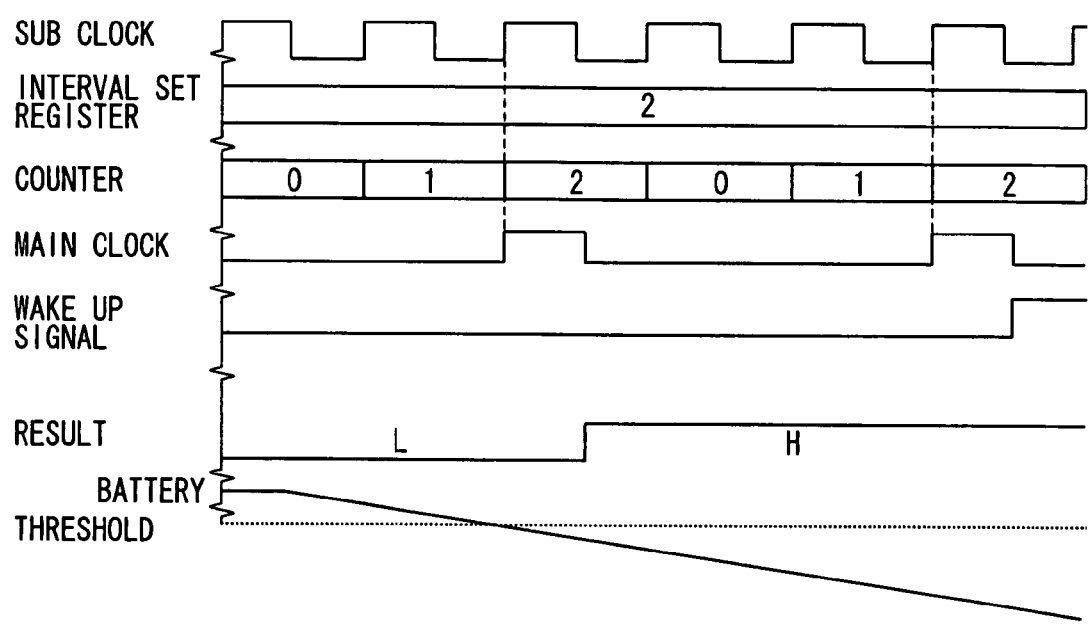
FIG. 7 is a timing chart illustrating when a wake up signal is outputted in the microcomputer of FIG. 6.

A microcomputer 41 according to a second embodiment is shown in FIGS. 6, 7. Differences between the microcomputer 21 of the first embodiment and the microcomputer 41 are in that the main oscillator 2 and the voltage detection circuit 23 are replaced with a main oscillator 42 and a voltage detection circuit 43, respectively.

In the microcomputer 21 according to the first embodiment, the A/D analog controller 8 and the filter circuit 31 are supplied with the sub clock signal, and the interrupt register 33 and the interrupt enable register 34 are supplied with the main clock signal via the first frequency divider circuit 5. In contrast, in the microcomputer 41 according to the second embodiment, the A/D analog controller 8, the filter circuit 31, the interrupt register 33, and the interrupt enable register 34 are supplied with the main clock signal directly from the main oscillator 42, i.e., without via the first frequency divider circuit 5.

Further, the timing signal outputted from the comparator 27 is fed to not only the A/D analog controller 8, but also the main oscillator 42. When the comparator 27 outputs the timing signal during a time of period when the CPU 22 stops the main oscillator 42 through the oscillation control circuit 4, the main oscillator 42 performs its operation for a predetermined time within which the voltage detection circuit 43 can perform the voltage monitoring function at least once. The oscillation stop circuit 3, the oscillation control circuit 4, and the signal output circuit 35 form a clock supply control circuit 44.

The drop in the battery voltage below the threshold value is detected in the sleep mode as shown in a timing chart of FIG. 7. In the case of FIG. 7, the multiplexer 30 selects the input from the filter circuit 31, and the detection interval data of "2" is set in the interval set register 26. Therefore, every time the count value of the interval counter 25 becomes two, the comparator 27 outputs the timing signal. Thus, in the sleep mode, the main oscillator 42 intermittently and periodically operates so that the main clock signal can be supplied to the voltage detection circuit 43. In this case, the output of the oscillation stop circuit 3 remains disabled so that the main clock signal cannot reach the CPU 22.

As shown in FIG. 7, when the battery voltage applied to the voltage input terminal is equal to or greater than the threshold value, the detection result outputted from the A/D analog controller 8 is low. When the battery voltage decreases below the threshold value, the detection result becomes high. The filter circuit 31 receives and holds the detection result. If the low battery voltage condition lasts, the detection result remains high. As a result, the previous detection result becomes equal to the present detection result so that the output of the filter circuit 31 is enabled. Thus, the wake up signal is outputted to the oscillation control circuit 4.

As described above, according to the second embodiment, the microcomputer 41 includes the sub oscillator 24 and the clock supply control circuit 44. The sub oscillator 24 operates independently of the main oscillator 42. In the sleep mode, the clock supply control circuit 44 prevents the main clock signal from being supplied to the CPU 22. Also, in the sleep mode, every time the signal output circuit 35 outputs the timing signal to the main oscillator 42, the clock supply control circuit 44 allows the main clock signal to be supplied to the voltage detection circuit 43 for the predetermined time.

Thus, even in the sleep mode, the main clock signal can be supplied to the voltage detection circuit 43 so that the voltage monitoring function can be intermittently and periodically performed. Therefore, the voltage monitoring function can be continued without the increase in the power consumption. Further, since the voltage detection circuit 43 operates based on the main clock signal, the voltage monitoring function can be performed more rapidly.

Third Embodiment

Figure 8:
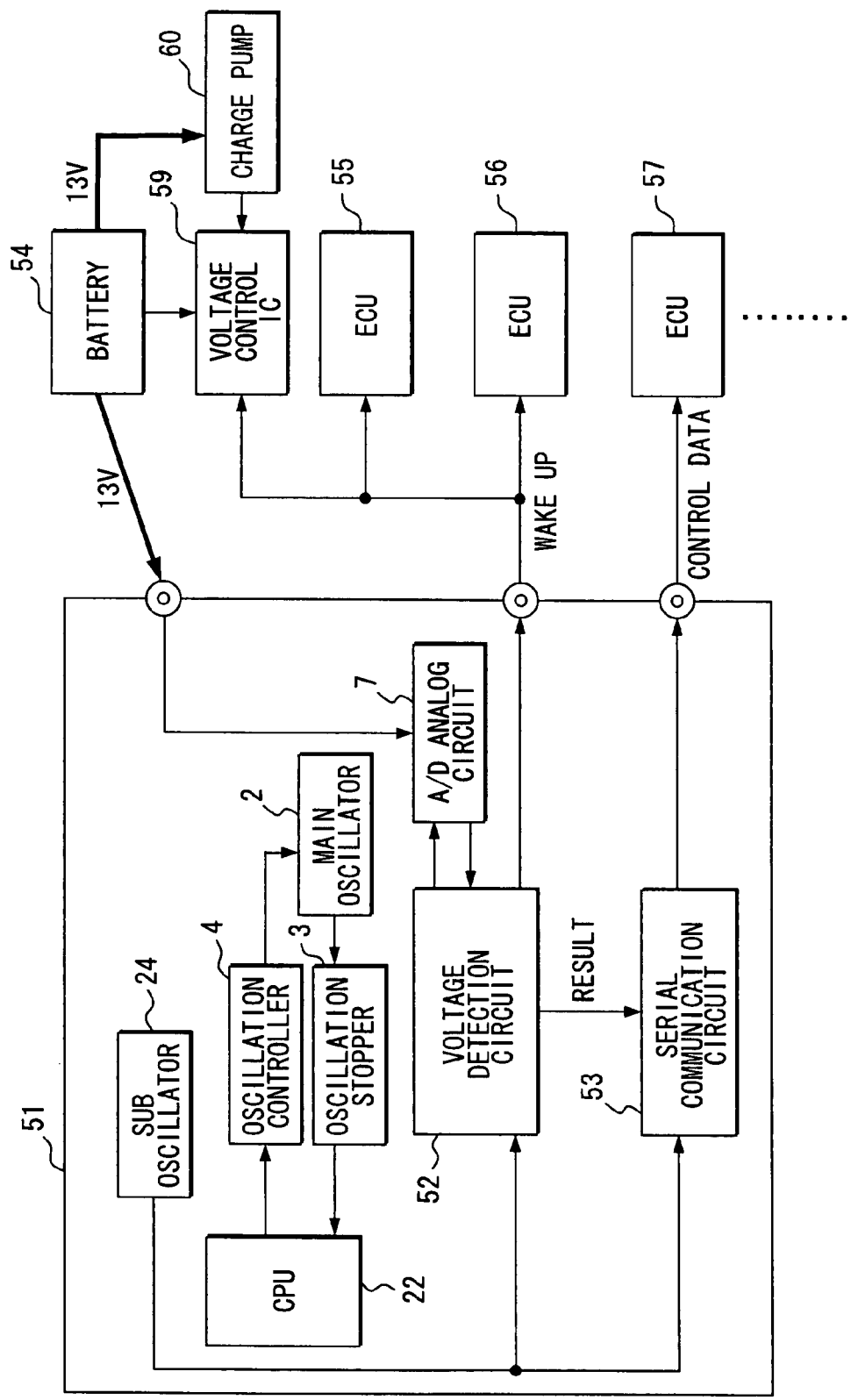
FIG. 8 is a block diagram of a control system according to a third embodiment of the present invention.

A control system according to a third embodiment of the present invention is shown in FIG. 8. The control system is constructed based on the microcomputer 21 of the first embodiment. The control system utilizes a microcomputer 51 having a structure similar to that of the microcomputer 21. The microcomputer 51 includes a voltage detection circuit 52 instead of the voltage detection circuit 23. Further, the microcomputer 51 includes a serial communication circuit 53.

The serial communication circuit 53 is supplied with the sub clock signal from the sub oscillator 24 and operates based on the sub clock signal. A timing signal outputted from the signal output circuit 35 of the voltage detection circuit 52 is fed to the serial communication circuit 53. The serial communication circuit 53 operates for a certain period of time in response to the timing signal. Thus, the serial communication circuit 53 intermittently and periodically operates approximately synchronously with the voltage detection circuit 52.

For example, the microcomputer 51 is constructed as a body ECU. The microcomputer 51 monitors a battery voltage of a vehicle battery 54 by using the voltage detection circuit 52. The normal voltage level of the vehicle battery 54 may be, for example, thirteen volts. The battery voltage is divided by a voltage divider circuit (not shown) constructed with resistors so that the battery voltage applied to the voltage input terminal ranges between zero volts and five volts. Alternatively, the A/D analog circuit 7 may include the voltage divider circuit, and the battery voltage may be divided inside the A/D analog circuit 7.

The microcomputer 51 outputs the wake up signal, which is outputted from the voltage detection circuit 52, to ECUs 55, 56, and a voltage control integrated circuit (IC) 59. The serial communication circuit 53 of the microcomputer 51 is connected to an ECU 57 that is connected to an in-vehicle local area network (LAN), for example.

The battery voltage is supplied to the ECUs 55-57. Each of the ECUs 55-57 has a power supply circuit (not shown) for generating a control voltage from the battery voltage. Each of the ECUs 55-57 operates by the control voltage. Further, the battery voltage is supplied to the voltage control IC 59. The voltage control IC 59 acts to keep the battery voltage at a voltage level suitable for the microcomputer 51, when the wake up signal is outputted from the microcomputer 51. Specifically, the voltage control IC 59 increases the battery voltage according to the drop in the battery voltage by using a charge pump circuit 60.

The control system works as follows: As with the voltage detection circuit 23 according to the first embodiment, in the sleep mode, the voltage detection circuit 52 intermittently and periodically operates at intervals determined by the detection interval data and the cycle data to monitor whether the battery voltage is kept at the suitable voltage level for the microcomputer 51. When the drop in the battery voltage below the threshold value is detected, the voltage detection circuit 52 outputs the wake up signal to the ECUs 55, 56, and the voltage control IC 59. Upon receipt of the wake up signal, the ECUs 55, 56 perform processing to handle the drop in the battery voltage. Further, upon receipt of the wake up signal, the voltage control IC 59 starts its operation so that the battery voltage is kept at the suitable voltage level for the microcomputer 51.

In this case, the voltage detection circuit 52 outputs the detection result (i.e., wake up signal) to the serial communication circuit 53. The serial communication circuit 53 converts the detection result to control data. The detection result is brought into correspondence with the control data in advance. The serial communication circuit 53 outputs the control data to the ECU 57, and the ECU 57 performs processing in accordance with the control data.

As described above, according to the third embodiment, the microcomputer 51 includes the voltage detection circuit 52 and the serial communication circuit 53. Each of the voltage detection circuit 52 and the serial communication circuit 53 operates based on the sub clock signal. The voltage detection circuit 52 controls the serial communication circuit 53 in such a manner that the microcomputer 51 communicates with external devices only when the detection result (i.e., the control data) needs to be sent to the external devices. Thus, power consumption required to communicate with the external devices can be reduced.

The control system is constructed with the microcomputer 51, and the ECUs 55-57. Each of the ECUs 55-57 operates by the control voltage generated from the batter voltage of the battery 54. The voltage detection circuit 52 monitors the battery voltage and detects the drop in the battery voltage. When the drop in the battery voltage is detected, the microcomputer 51 informs the ECUs 55-57 of the drop in the battery voltage. Thus, the ECUs 55-57 can perform processing to handle the drop in the battery voltage.

The voltage control IC 59 acts to keep the battery voltage at the voltage level suitable for the microcomputer 51, when the wake up signal is outputted from the microcomputer 51 in the sleep mode. Thus, the microcomputer 51 can have sufficient time to perform processing to handle the drop in the battery.

MODIFICATIONS

The embodiment described above may be modified in various ways. For example, the interval set register 26 may be eliminated from the voltage detection circuits 23, 43, and 52 so that the voltage detection cycles of the voltage detection circuits 23, 43, and 52 are fixed. The second frequency divider circuit 28 and the clock select register 29 may be eliminated from the voltage detection circuits 23, 43, 52. The multiplexer 30, the filter circuit 31, and the filter select register 32 may be eliminated from the voltage detection circuits 23, 43, and 52. For example, the output of the filter circuit 31 may be always adopted as the detection result. The detection result may be used as one or two of the wake up signal to the oscillation control circuit 4, the interrupt request signal to the CPU 22, and the output signal to the external device.

The control system according to the third embodiment may be constructed based on the microcomputer 41 according to the second embodiment. The battery voltage of the battery 54 may be detected at several levels, and the detection result may consist of several bits. In this case, the serial communication circuit 53 may have a mapping table defining the mapping of the detection result to the control data. The serial communication circuit 53 may convert the detection result to corresponding control information by using the mapping table. The control data may limit some of functions of the ECU 57 to reduce current consumption. If the ECU 57 operates in the sleep mode when receiving the control data, the control data may cause the ECU 57 to continue to operate in the sleep mode to reduce the current consumption.

The control system may include other charging circuits than the charge pump circuit 60. For example, the charge pump circuit 60 may be replaced with a capacitor having a very large capacitance. The voltage control IC 59 may be eliminated from the control system.

Such changes and modifications are to be understood as being within the scope of the present invention as defined by the appended claims.

What is claimed is:

1. A microcomputer comprising:
   a main oscillator for generating and outputting a main clock signal having a first frequency;
   a sub oscillator for generating and outputting a sub clock signal having a second frequency less than the first frequency;
   a central processing unit that operates based on the main clock signal;

a signal output circuit that operates based on the sub clock signal and outputs a timing signal at a predetermined interval; and a voltage monitoring circuit that operates based on the sub clock signal and intermittently performs a voltage monitoring function in response to the timing signal, the voltage monitoring function monitoring a voltage at a certain point of the microcomputer.

2. The microcomputer according to claim 1, wherein the interval of the timing signal is adjusted by the central processing unit.

3. A microcomputer comprising:
a main oscillator for generating and outputting a main clock signal having a first frequency;
a sub oscillator for generating and outputting a sub clock signal having a second frequency less than the first frequency;
a central processing unit that operates based on the main clock signal;
a signal output circuit that operates based on the sub clock signal and outputs a timing signal at a predetermined interval; and
a voltage monitoring circuit that operates based on the sub clock signal and intermittently performs a voltage monitoring function in response to the timing signal, the voltage monitoring function monitoring a voltage at a certain point of the microcomputer, wherein
the voltage monitoring circuit includes a comparator and a determination circuit,
the comparator compares the voltage with a threshold value and outputs comparison data indicative of a result of the comparison,
the determination circuit stores first and second comparison data, the first comparison data outputted from the comparator at a previous time, the second comparison data being outputted from the comparator at a present time immediately subsequent to the previous time, the determination circuit determining whether the previous comparison data is equal to the present comparison data and outputting determination data indicative of a result of the determination,
the central processing unit selects one of the comparison data and the determination data, and
the voltage monitoring circuit outputs the selected one of the comparison data and the determination data.

4. The microcomputer according to claim 3, wherein the selected one of the comparison data and the determination data is used for producing at least one of an interrupt request signal to interrupt the central processing unit, a wake up signal to cause the microcomputer to wake up from a low power consumption mode, and an output signal to an external device.

5. The microcomputer according to claim 4, wherein the selected one of the comparison data and the determination data is used for producing the output signal to the external device.

6. The microcomputer according to claim 1, further comprising:
a communication circuit that operates based on the sub clock signal, wherein
the voltage monitoring circuit controls the communication circuit to communicate with an external device.

7. A microcomputer comprising:
a main oscillator for generating and outputting a main clock signal having a first frequency;
a sub oscillator for generating and outputting a sub clock signal having a second frequency less than the first frequency;
a central processing unit that operates based on the main clock signal;
a signal output circuit that operates based on the sub clock signal and outputs a timing signal at a predetermined interval;
a voltage monitoring circuit that operates based on the sub clock signal and intermittently performs a voltage monitoring function in response to the timing signal, the voltage monitoring function monitoring a voltage at a certain point of the microcomputer; and
a communication circuit that operates based on the sub clock signal, wherein
the voltage monitoring circuit controls the communication circuit to communicate with an external device,
the voltage is monitored at a plurality of levels and the monitored voltage has one of the plurality of levels,
the voltage monitoring circuit outputs result data corresponding to the one of the plurality of levels to the communication circuit, and
the communication circuit outputs control data corresponding to the result data.

8. A control system comprising:
the microcomputer of claim 1; and
a control device receiving a signal from the microcomputer, wherein
the microcomputer has a terminal for receiving a power supply voltage, and
the voltage monitoring function monitors the voltage at the terminal.

9. The control system according to claim 8, wherein when the signal indicates a drop in the voltage, the control device acts to keep the voltage at a predetermined level.

10. A microcomputer comprising:
a main oscillator for generating and outputting a main clock signal having a first frequency;
a sub oscillator for generating and outputting a sub clock signal having a second frequency less than the first frequency;
a central processing unit that operates based on the main clock signal;
a signal output circuit that operates based on the sub clock signal and outputs a timing signal at a predetermined interval;
a voltage monitoring circuit that operates based on the main clock signal and performs a voltage monitoring function, the voltage monitoring function monitoring a voltage at a certain point of the microcomputer; and
a stopper circuit for preventing the main clock signal from being supplied to the central processing unit during a low power consumption mode of the microcomputer, wherein
the main oscillator operates for a predetermined time in response to the timing signal during the low power consumption mode to supply the main clock signal to the voltage monitoring circuit.

11. The microcomputer according to claim 10, wherein the interval of the timing signal is adjusted by the central processing unit.

12. A microcomputer comprising:
a main oscillator for generating and outputting a main clock signal having a first frequency;
a sub oscillator for generating and outputting a sub clock signal having a second frequency less than the first frequency;

a central processing unit that operates based on the main clock signal;

a signal output circuit that operates based on the sub clock signal and outputs a timing signal at a predetermined interval;

a voltage monitoring circuit that operates based on the main clock signal and performs a voltage monitoring function, the voltage monitoring function monitoring a voltage at a certain point of the microcomputer; and a stopper circuit for preventing the main clock signal from being supplied to the central processing unit during a low power consumption mode of the microcomputer, wherein the main oscillator operates for a predetermined time in response to the timing signal during the low power consumption mode, the voltage monitoring circuit includes a comparator and a determination circuit, the comparator compares the voltage with a threshold value and outputs comparison data indicative of a result of the comparison, the determination circuit stores first and second comparison data, the first comparison data outputted from the comparator at a previous time, the second comparison data being outputted from the comparator at a present time immediately subsequent to the previous time, the determination circuit determining whether the previous comparison data is equal to the present comparison data and outputting determination data indicative of a result of the determination, the central processing unit selects one of the comparison data and the determination data, and the voltage monitoring circuit outputs the selected one of the comparison data and the determination data.

13. The microcomputer according to claim 12, wherein the selected one of the comparison data and the determination data is used for producing at least one of an interrupt request signal to interrupt the central processing unit, a wake up signal to cause the microcomputer to wake up from the low power consumption mode, and an output signal to an external device.

14. The microcomputer according to claim 13, wherein the selected one of the comparison data and the determination data is used for producing the output signal to the external device.

15. The microcomputer according to claim 10, further comprising:

a communication circuit that operates based on the sub clock signal, wherein the voltage monitoring circuit controls the communication circuit to communicate with an external device.

16. A microcomputer comprising:

a main oscillator for generating and outputting a main clock signal having a first frequency;

a sub oscillator for generating and outputting a sub clock signal having a second frequency less than the first frequency;

a central processing unit that operates based on the main clock signal;

a signal output circuit that operates based on the sub clock signal and outputs a timing signal at a predetermined interval;

a voltage monitoring circuit that operates based on the main clock signal and performs a voltage monitoring function, the voltage monitoring function monitoring a voltage at a certain point of the microcomputer;

a stopper circuit for preventing the main clock signal from being supplied to the central processing unit during a low power consumption mode of the microcomputer; and a communication circuit that operates based on the sub clock signal, wherein the main oscillator operates for a predetermined time in response to the timing signal during the low power consumption mode, the voltage monitoring circuit controls the communication circuit to communicate with an external device, the voltage is monitored at a plurality of levels and the monitored voltage has one of the plurality of levels, the voltage monitoring circuit outputs result data corresponding to the one of the plurality of levels to the communication circuit, and the communication circuit outputs control data corresponding to the result data.

17. A control system comprising:

the microcomputer of claim 10; and a control device receiving a signal from the microcomputer, wherein the microcomputer has a terminal for receiving a power supply voltage, and the voltage monitoring function monitors the voltage at the terminal.

18. The control system according to claim 17, wherein when the signal indicates a drop in the voltage, the control device acts to keep the voltage at a predetermined level.

19. The microcomputer according to claim 1, wherein the voltage monitoring circuit includes an A/D converter.

20. The microcomputer according to claim 10, wherein the voltage monitoring circuit includes an A/D converter.

* * * * *